(12) United States Patent
Caillet et al.

(10) Patent No.: US 9,305,541 B2
(45) Date of Patent: Apr. 5, 2016

(54) METHOD AND AN ACTIVE DEVICE FOR TREATING NOISE ON BOARD A VEHICLE, AND A VEHICLE PROVIDED WITH SUCH A DEVICE

(71) Applicant: AIRBUS HELICOPTERS, Marignane (FR)

(72) Inventors: Julien Caillet, Les Pennes Mirabeau (FR); Franck Marrot, La Ciotat (FR)

(73) Assignee: AIRBUS HELICOPTERS, Marignane (FR)

( * ) Notice: Subject to any disclaimer, the term of this patent is extended or adjusted under 35 U.S.C. 154(b) by 161 days.

(21) Appl. No.: 14/059,469

(22) Filed: Oct. 22, 2013

(65) Prior Publication Data

US 2014/0112490 A1    Apr. 24, 2014

(30) Foreign Application Priority Data

Oct. 23, 2012   (FR) ..................................... 12 02821

(51) Int. Cl.
  *G10K 11/16*   (2006.01)
  *G10K 11/178*  (2006.01)

(52) U.S. Cl.
  CPC ........ *G10K 11/1788* (2013.01); *G10K 11/1784* (2013.01); *G10K 2210/1281* (2013.01); *G10K 2210/3055* (2013.01); *G10K 2210/3221* (2013.01)

(58) Field of Classification Search
  None
  See application file for complete search history.

(56) References Cited

U.S. PATENT DOCUMENTS

| | | | |
|---|---|---|---|
| 4,977,600 A | 12/1990 | Ziegler | |
| 5,133,017 A * | 7/1992 | Cain et al. | 381/71.6 |
| 5,754,662 A | 5/1998 | Jolly et al. | |
| 5,845,236 A | 12/1998 | Jolly et al. | |
| 5,987,144 A | 11/1999 | Carme et al. | |
| 6,002,778 A | 12/1999 | Rossetti et al. | |
| 6,138,947 A | 10/2000 | Welsh et al. | |
| 6,224,014 B1 | 5/2001 | Dussac | |
| 6,343,127 B1 | 1/2002 | Billoud | |

(Continued)

FOREIGN PATENT DOCUMENTS

| | | |
|---|---|---|
| DE | 102011013343 | 9/2012 |
| EP | 0917706 B1 | 5/2002 |

(Continued)

OTHER PUBLICATIONS

French Search Report for FR 1202821, Completed by the French Patent Office on Aug. 5, 2013, 7 Pgaes.

(Continued)

*Primary Examiner* — Andrew L Sniezek
(74) *Attorney, Agent, or Firm* — Brooks Kushman P.C.

(57) ABSTRACT

A noise treatment device (D) comprising at least one local noise sound sensor (30) and at least one sound system having a support (11, 12) and at least one sound actuator (21, 22, 21', 22'). The device also includes a position sensor for determining the position of a person's head, at least one treatment unit (40, 40') connected to the local noise sound sensor to receive a local noise signal and configured to deliver a control signal to each sound actuator (21, 22, 21', 22'), the control signal being a function of the local noise signal and of at least one transfer function per ear, and active matching means (70) co-operating with the position sensor in order to keep each transfer function used in preparing each control signal representative of the path to be traveled by the anti-noise.

20 Claims, 3 Drawing Sheets

(56) References Cited

U.S. PATENT DOCUMENTS

| | | | |
|---|---|---|---|
| 6,502,043 | B2 | 12/2002 | Dussac |
| 6,553,296 | B2 | 4/2003 | Breed et al. |
| 8,160,264 | B2 * | 4/2012 | Itou et al. .................. 381/71.12 |
| 2002/0076059 | A1 * | 6/2002 | Joynes ......................... 381/71.6 |
| 2004/0170286 | A1 | 9/2004 | Durach et al. |
| 2008/0019536 | A1 * | 1/2008 | Marrot ......................... 381/71.4 |
| 2010/0111317 | A1 * | 5/2010 | Asao et al. .................. 381/71.4 |

FOREIGN PATENT DOCUMENTS

| | | |
|---|---|---|
| EP | 1031136 B1 | 7/2004 |
| EP | 2119627 | 11/2009 |
| EP | 2149875 A1 | 2/2010 |
| FR | 2769396 | 4/1999 |
| FR | 2802328 | 6/2001 |
| FR | 2808371 | 11/2001 |
| FR | 2899011 | 9/2007 |
| GB | 2360900 | 10/2001 |
| WO | 9631872 | 10/1996 |
| WO | 9806089 | 2/1998 |
| WO | 9910877 | 3/1999 |
| WO | 0014722 | 3/2000 |
| WO | 03073415 | 9/2003 |

OTHER PUBLICATIONS

Kataja et al. Joint Baltic-Nordic Acoustics Meeting 2004, Jun. 8-10, 2004, p. BNAM2004-1-BNAM2004-5, "Selection of Active Noise Control Strategy: Two Test Cases."

European Search Report Dated Mar. 3, 2014, Application No. 13004872.1-1559, Applicant Aribus Helicopters, 8 Pages.

* cited by examiner

METHOD AND AN ACTIVE DEVICE FOR TREATING NOISE ON BOARD A VEHICLE, AND A VEHICLE PROVIDED WITH SUCH A DEVICE

CROSS REFERENCE TO RELATED APPLICATIONS

This application claims priority to French patent application No. FR 12 02821 filed on Oct. 23, 2012, the disclosure of which is incorporated in its entirety by reference herein.

BACKGROUND OF THE INVENTION (1) Field of the Invention

The present invention relates to a method and an active device for treating noise on board a vehicle, and to a vehicle having such a device.

The invention thus relates to the field of treating sound nuisance on board an aircraft.

(2) Description of Related Art

The present invention relates more particularly to noise treatment systems. Reducing noise in aircraft is a problem of increasing severity because of the impact of noise on the comfort and the health of the occupants of an aircraft, whether they be passengers or crew.

Impacts on passenger health are also generally estimated in consideration of metrics corresponding to "doses" of noise, where the amplitude of the metric depends both on the noise level and on the duration of exposure to that noise.

The sound level inside aircraft can be treated by incorporating passive treatment seeking to isolate the occupants from external noise sources and to absorb soundwaves reflected in the cabin.

Furthermore, active control methods seek to generate anti-noise for inducing a bubble of silence. Such active control methods have been found to be effective in reducing low frequency harmonic noise or medium frequency or high frequency noise in localized zones. The development of such active techniques in aircraft presenting harmonic sound signatures is particularly suitable for maximizing efficiency on target frequencies while keeping down extra weight.

Nevertheless, at low frequencies, active noise control presents limits that are generally associated with the ability to generate a sound level that is equivalent to the ambient sound level being controlled (in particular in noisy environments).

Furthermore, at high frequencies, active noise control presents limits associated with the calculation capacity of computers and with the very localized effect of the control. At high frequencies, soundwaves present wavelengths that are short. As a result, an active noise control device operating at high frequencies tends to generate a bubble of silence of dimensions that are small, such that the bubble is very localized.

In addition, present-day active noise control techniques also present difficulties in controlling signals having properties that vary rapidly in time.

Active anti-noise techniques thus generally consist in generating anti-noise in the form of a soundwave for attenuating the noise. Such anti-noise is sometimes referred to as "secondary" noise in contrast to the noise that is to be treated, which is sometimes referred to as "primary" noise.

A distinction is generally drawn between "feedforward" techniques that predict or anticipate noise by using a reference primary sensor for sensing noise that is correlated with the source of primary noise that is to be controlled in order to be able to anticipate variations in the primary noise, and "feedback" techniques in which such variations are compensated after they have appeared.

Feedback techniques use algorithms that are known to the person skilled in the art, e.g. the recursive least mean square algorithm or the internal model control algorithm, known by the acronyms RLMS or IMC, whereas feedforward techniques use algorithms that are known to the person skilled in the art, e.g. the filtered reference least mean square algorithm, known by the acronyms LMS or FxLMS.

Furthermore, in this technical field, it is possible to use a device for measuring local noise. The device for measuring local noise seeks to determine the noise that results from combining the secondary and primary noises.

This local noise measurement device may include a local noise sensor that is referred to by the person skilled in the art as an "error" sensor. As a function of the measured local noise, the treatment unit then adapts the coefficients of the filter implemented by the algorithm in use.

Thus, a computer prepares a control signal for a sound actuator while taking into consideration a transfer function that evaluates a natural sound filter associated with the environment of an individual.

It should be recalled that a transfer function serves to establish a mathematical relationship between a noise emitted at a given location and the noise that results at some other location, and more concretely a link between the secondary noise emitted by sound actuators and the determined local noise. Such a transfer function is sometimes referred to by the person skilled in the art as a "secondary" transfer function.

The transfer function thus depends on the path followed by the anti-noise between a sound actuator and an error sensor, for example. One known solution consists in identifying the transfer function in real time by an "inline identification" method.

Although those prior art systems are indeed effective, incorporating them in a rotorcraft encounters problems that are complex, associated in particular with the high level of the noise to be attenuated, the large number of "spectrum" lines, sometimes referred to as tone components, in the spectrum of the noise to be attenuated, which spectrum lines are situated in a frequency band extending up to about 10,000 hertz (Hz), and to the presence of broadband noise in such a spectrum, in particular at frequencies situated in a range going from 10 Hz to 1000 Hz.

According to the document "Selection of active noise control strategy: two test cases" by Jari Kataja et. al, Joint Baltic-Nordic Acoustics Meeting 2004, Jun. 8-10, 2004, psychoacoustic phenomena should be taken into account when selecting the technique to use.

Patents FR 2 769 396 and U.S. Pat. No. 6,224,014 propose reducing spectrum line noise inside a helicopter by controlling a sound actuator as a function of measurements delivered by a sound or vibration sensor.

Those documents concentrate on reducing spectrum line noise coming from mechanical members. That type of control thus treats only a portion of the noise and does not provide effective three-dimensional control for all of the passengers in a cabin.

Proposals are made in patents FR 2 802 328 and U.S. Pat. No. 6,502,043 also to make use of a (reference) sensor that makes measurements correlated with a noise source, and to weight the noise measurement signals in order to give priority to determined zone of the aircraft, e.g. in the proximity of the passenger seats.

The sound actuators used may be loudspeakers or piezoelectric actuators, and the sensors may be microphones or accelerometers. The algorithms used for minimizing noise may be of the feedforward or of the feedback type.

Nevertheless, that solution does not make it possible to track movements of the passengers' ears, and thus to adapt the zone in which control is effective in real time.

Patent EP 1 031 136 describes an active system for attenuating noise inside the cabin of a helicopter having a main gearbox and legs or bars securing the gearbox to the structure of the cabin. The system includes a plurality of actuators linked to each of the legs for applying "opposing-vibrations" to each of the legs, in order to reduce the vibrations that give rise to noise coming from gears of said gearbox, at a frequency that is close to 700 Hz.

That solution has a limited frequency range and it is above all limited in its three-dimensional effectiveness. At such frequencies, it is possible to obtain optimized overall control for all passenger positions solely by canceling vibration in the gearbox legs. Transfers between the legs and passenger positions differ from one passenger position to another. The only way to obtain the same effectiveness on the noise derived from vibration transfer regardless of passenger position would be to cancel vibration completely in each leg.

Nevertheless, there remains noise resulting from transfer through the air, which noise is not controlled by the actuators. Unfortunately, this noise due to transfer by air is not negligible in helicopters. Furthermore, the transfer of this noise likewise differs from one position to another.

Furthermore, the solutions proposed in the above-mentioned patents deal solely with spectrum line noise from mechanical systems and therefore they do not enable "broadband" noise to be reduced, which noise might be of aerodynamic origin.

Patent U.S. Pat. No. 5,845,236 proposes using an active attenuator device in addition to vibratory resonators.

Patent U.S. Pat. No. 5,754,662 proposes treating low frequency noise and noise at frequencies higher than the low frequencies separately, and controlling two actuators separately, one adapted to the low frequencies and the other to the higher frequencies. Proposals are made in particular to use a sub-woofer for low frequencies.

Patent EP 0 917 706 describes a noise attenuation system adapted to a twin-engined airplane.

That patent describes treating structural vibration of an aircraft, and consequently treating the sound radiation source of the structure via vibratory actuators placed on the structure.

Patent FR 2 899 011 describes a channel separation control device using a member for psychoacoustically weighting the received and/or emitted signals.

One channel is dedicated to controlling very low frequencies via a sound actuator having an optimized vent or electromechanical vibrator. Another channel is dedicated to controlling medium and high frequencies via microphone-and-loudspeaker pairs at passenger positions.

The microphones are fastened to the seats, and the loudspeakers are also stationary.

Furthermore, nothing makes it possible to take into consideration the influence of movement of a passenger's head on the noise measurement and on the transmission of the anti-noise. The three-dimensional zone in which noise control is effective at high frequencies can then be limited and the bubble of silence that is created does not follow the passenger.

Patent U.S. Pat. No. 4,977,600 descries an active seat using a set of microphones in a headrest as error microphones in order to generate a control zone of defined shape. That patent also describes the possibility of using a plurality of sound actuators for separate frequency bands.

Patent U.S. Pat. No. 6,343,127 describes an active sound control system that positions sound actuators in an enclosure.

Document WO 03/073415 describes another system in which variable signals are weighted over time in order to avoid saturating the actuators.

Document WO 00/14722 provides an integrated active noise control system, with a passenger adapting the position of an assembly comprising a sound actuator and a sensor in order to improve performance.

Document FR 2 899 011 seeks to solve such problems with the help of a device comprising:
  at least one local noise sensor such as a microphone situated in a cabin;
  at least one loudspeaker;
  at least one treatment unit arranged to receive noise measurement signals delivered by the microphone(s), and to deliver control signals to the loudspeaker(s) in order to attenuate noise in the cabin; and
  at least one sound resonator acoustically coupled to a loudspeaker and to the cabin.

The treatment unit then issues a control signal for generating a secondary noise suitable for opposing a primary noise, and it sends this control signal to the loudspeaker and to the resonator.

The secondary noise is prepared with the help of a feedforward or feedback type algorithm by taking into consideration a local noise signal coming from the local noise sensor, and where appropriate a reference primary noise signal coming from a reference primary noise sensor.

Thus, the treatment unit instructs the sound actuator to generate secondary noise that is optimized to be in phase opposition with the primary noise.

The treatment unit may seek to minimize the local noise as measured in decibels (dB) or to minimize a predetermined function that takes passenger comfort into account by using a psychoacoustic approach.

That device is particularly effective in reducing harmonic noise at low and medium frequencies by creating a bubble of silence over a large area.

It is possible to envisage adapting the device to enable it to reduce high frequency noise. Unfortunately, the loudspeaker would then create a bubble of silence of small size, while generating additional noise that is particularly troublesome outside the bubble of silence.

Under such circumstances, the device does not appear to be suitable for high frequency noise. It should be observed that such high frequency noise is particularly troublesome insofar as it lies in a frequency range corresponding to maximum sensitivity of a human ear.

In addition, the movement of an individual's head has an impact on the response of the actuators by modifying the path over which the anti-noise is transmitted, referred to as the secondary path.

Furthermore, it should be observed that Document U.S. 2004/0170286 provides for a system serving to adapt a sound device of a vehicle as a function of the presence or absence of people in the vehicle, such presence being detected by a shape recognition system.

Document U.S. Pat. No. 6,553,296 describes a device capable of determining the macroscopic presence and the relative position of an occupant in a vehicle.

Those two documents do not appear to be capable of solving the new problem relating to reducing or eliminating the trouble created by high frequency noise as a function of the position of an individual's ears relative to sound actuators.

Document EP 2 119 627 proposes sliding a sound actuator support in a cavity placed in a seat back, the sliding relating to the inclination a passenger requests of the seat proper of that seat.

The seat also has a shell surrounding the passenger. Such a shell can be troublesome in a cabin of small dimensions, such as a rotorcraft cabin, for example.

Document FR 2 808 371 describes an active control device incorporated in the headrests of seats and making it possible remotely to measure sound in the proximity of an ear.

Also known are Documents WO 96/31872 and DE 10 2011 013343.

BRIEF SUMMARY OF THE INVENTION

An object of the present invention is thus to provide an active device seeking to attenuate the noise perceived by an occupant of an aircraft.

According to the invention, a device for treating noise in the proximity of the head of a passenger in a vehicle includes at least one local noise sound sensor. The device also includes at least one sound system for generating anti-noise, each sound system being provided with a support and with at least one sound actuator carried by the support.

For example, the device has two sound systems arranged on either side of the passenger's head. Each sound actuator delivers respective secondary anti-noise to each ear, thereby enabling the device to be optimized.

That device is particularly remarkable in that it comprises:
- a position sensor for determining the position of the passenger's head;
- at least one treatment unit connected to the local noise sound sensor in order to receive a local noise signal, the treatment unit being configured to deliver a control signal to each sound actuator, which control signal is a function at least of the local noise signal and of at least one transfer function per ear and relating to transferring soundwaves between a sound actuator and the passenger; and
- active matching means co-operating with the position sensor in order to keep each transfer function that is used in preparing each control signal representative of the path to be traveled by said anti-noise.

In variants, the treatment unit and the matching means may be members of two distinct pieces of equipment, or they may be components of a single computer.

For example, a computer may have a memory member and a calculation member executing instructions stored in the memory member in order to perform the role of a treatment unit and the role of matching means.

The local noise sound sensor seeks to determine a local noise in the immediate proximity of the passenger's head.

Under such circumstances, in a first version, the local noise sensor may be a sound sensor arranged on an individual's head.

The local noise sensor is movable so as to move together with the passenger's head, and more precisely with at least one ear of that head.

Thus, the local noise sound sensor is constituted for example by a microphone placed on an earpiece, with the passenger placing the earpiece close to one ear.

Likewise, the microphone may be arranged on a headset used for listening to a radio broadcast or indeed to the soundtrack of a video.

The local noise sound sensor is connected to the treatment unit by a wired link or by a wireless link.

In a second version, the local noise sensor is a sound sensor that does not measure noise in the proximity of an ear directly. The local noise sensor may be arranged on the seat in which a passenger is seated.

This second version presents the advantage of not requiring passengers to use headsets, for example.

The first and second versions can be combined. Thus, the first version is used when an individual desires to use a headset or an earpiece, otherwise the second version is used.

The treatment unit determines the secondary noise by making use firstly of the signal coming from the local noise sensor, and secondly the signal coming from the position sensor.

By using a conventional algorithm, the treatment unit can then reconstitute the local noise.

In summary, the local noise is measured directly in the first version, while the local noise is determined in the second version.

Furthermore, each sound actuator possibly comprises a loudspeaker, such as a loudspeaker used for issuing messages in the vehicle and forming part of a public address or a passenger address system.

In addition, the position sensor may be an ordinary system for measuring the position of an article. The position sensor is connected to the treatment unit in order to supply it with a position signal that relates equally well to the position of an individual's head or more particularly to the position of the ears of that head.

The treatment unit possibly does not send the control signal to the sound actuators for the purpose of requesting the emission of secondary noise whenever the passenger's head, or more specifically whenever at least one of the passenger's ears, lies in a zone where said actuators are ineffective.

It should be recalled that the bubble of silence created by the sound actuators is of small dimensions because of the short wavelength of high frequency soundwaves. Furthermore, it should also be recalled that outside the bubble of silence, the secondary noise adds to the primary noise and thus makes the overall noise more disagreeable.

Thus, if an individual's head or at least one ear lies outside the field that can be covered by a bubble of silence, the treatment unit may cease requesting secondary noise to be created.

For example, if the passenger leans forward to reach an article on the floor, the sound actuators are no longer capable of creating a bubble of silence at the passenger's ears. The sound actuators then do not emit any secondary noise.

It should be observed that the position sensor may be of a conventional type, and in particular it may make use of the means described in Documents U.S. 2004/0170286 or U.S. Pat. No. 6,553,296.

Thus, the invention provides for measuring the local noise in the immediate proximity of an individual. It then becomes possible to treat noise at high frequencies. The bubble of silence generated to counter noise at high frequency, i.e. at a frequency greater than 500 Hz, is necessarily of small size, but nevertheless sufficiently large to be located on the passenger's ear, the bubble of silence moving together with the passenger's ears.

The device thus provides an active system, the treatment unit modifying the control signal sent to each sound actuator as a function of the position of the passenger's head, and preferably as a function of the positions of the passenger's ears. Furthermore, the treatment unit modifies the control signal as a function of the primary noise that is to be controlled, i.e. the reference primary noise that is to be reduced or even eliminated.

The treatment unit may comprise a processor associated with a memory, for example.

Compared with Document WO 00/14722, it should be observed that the passenger needs to cause a system to move in order to improve performance. In the present invention, the relative position of the local noise sound sensor and the actuator varies. As a result the fixed distance constraint between the sound actuator and the sound sensor that is imposed by document WO 00/14722 is eliminated.

Nevertheless, passengers tend to move their heads. Under such circumstances, any head movement tends to lead to changes in the transfer functions. Without intervention, the generated anti-noise can turn out to be ineffective or even counterproductive.

Consequently, the device of the invention includes matching means that co-operate with the position sensor. When the position of a passenger's head varies, the device makes use of the matching means to take this movement into consideration so as to ensure that the transfer functions used are always representative of the path to be traveled by said anti-noise.

The active matching means act continuously on each sound system during a flight, unlike devices that make provision for the actuator to be moved as a function of the position of a seat, for example.

The combination of a local noise sensor, a position sensor, a treatment unit, and active matching means makes it possible to generate a bubble of silence that is small and in the proximity of an individual, independently of the position of the individual's head.

Furthermore, the treatment device may include one or more of the following characteristics.

For example, the active matching means may comprise:
either maintaining means configured to act on each sound system so as to keep each of the transfer functions used by the treatment unit constant; or
determination means configured to select, from a library, each transfer function that matches a current position of said head; or else
both said maintaining means and said determination means.

Under such circumstances, in a first embodiment, the transfer functions to be used are modified when an individual's head moves in order to match them with a new path to be traveled by the anti-noise.

In a first embodiment, the active matching means may have a library of transfer functions, each associated with one position of an individual's head, and determination means configured to determine which transfer function to use as a function of said position, the treatment unit then using the transfer function as determined by the determination means.

The manufacturer can thus perform tests to build up such a library.

In contrast, in a second embodiment, the sound system is adapted when an individual's head moves so that the transfer functions used continue to be representative of the paths to be traveled by the anti-noise.

In a first variant of the second embodiment, the support includes respective support means for each sound system, with each support means carrying at least one sound actuator, and the active matching means may include a movement system for continuously moving each support means as a function of the position of the head of a passenger so as to keep each transfer function used in preparing each control signal representative of the path to be traveled by said anti-noise.

For example, the movement system comprises at least one actuator for moving each support means. When a passenger's head moves, the active matching means then cause the sound systems to move accordingly.

In a second variant of the second embodiment, each sound system has a plurality of actuators, and the active matching means has control means for continuously controlling each actuator as a function of the position of a passenger's head.

For example, each sound system may have a plurality of loudspeakers.

Depending on the position of an individual's head, certain loudspeakers are activated or deactivated.

It is also possible to generate one control signal for each loudspeaker, and to weight these signals with weighting gains as a function of the position of an individual's head.

Furthermore, and independently of the embodiment, each support may include passive soundproofing means.

When each support of a sound system includes support means carrying a respective sound actuator of the sound system, with each support means including a shell, and said passive soundproofing means include foam soundproofing material arranged in each shell.

Reference may be made to the literature in order to determine the characteristics that enable the desired results to be achieved.

The invention thus optionally provides for associating a passive soundproofing system with an active system.

Thus, the support may present passive soundproofing means to provide passive soundproofing.

Such passive soundproofing means may be surprising in an aircraft of small size such as a rotorcraft. Nevertheless, associating an active system with a passive system makes it possible to provide passive soundproofing that is very localized, and therefore compact.

The active soundproofing provided makes it possible, for example, to optimize the filtering of noise emitted in a frequency range that extends, for example, from a frequency of about 50 Hz to a frequency of about 3000 Hz.

Furthermore, the passive soundproofing provided serves for example to optimize the filtering of noise that is emitted outside that frequency range.

The invention thus proposes novel coupling of passive noise treatment with active noise treatment, with both of these treatments being incorporated in a sound system that may include supports of the "headrest" type.

The term "coupling" is used to mean that the design of the passive protection is optimized firstly so as to treat signals that are difficult to control by active treatment because of their frequency range and because of their signature or their varying nature (e.g. aerodynamic noise), and secondly so as to enable the performance of the active treatment to be improved.

One of the technical limits on active control lies in the difficulty in attenuating the various signal components that present large dynamic range. The use of appropriate passive treatments, based on absorption and insulation, can thus serve to reduce the dynamic range of the portion that can be controlled by active treatment of the signal. The active control algorithms are thus adapted to the defined passive protection. This approach makes it possible to avoid or at least to reduce the need to add specific filters in the active control loop, which filters give rise to additional calculations and delays in the transmission of anti-noise.

Furthermore, in order to optimize the coefficients of the filter provided by the treatment unit, in a first version, the treatment unit may perform an algorithm of the feedforward type. Under such circumstances, the device has a sensor for sensing primary noise correlated with a source of noise to be treated, the primary noise sensor being connected to the treatment unit in order to deliver a primary noise signal thereto.

In a second version, the treatment unit may use a feedback type algorithm. The treatment unit then generates the primary noise that is to be treated artificially, with this being done as a function both of the control signal it sends and of the local noise signal it receives.

In addition, the device may have a dose-metering device configured to determine the "dose" of noise received by the passenger on the basis of information coming from the local noise sensor, with the dose-metering device co-operating with the treatment unit.

The dose-metering device may comprise a processor integrating the local noise signal over a period of time in order to evaluate the "dose" of noise that is received.

The processor may weight the integrated signal using known techniques in order to refer to A-weighted decibels of the kind used when measuring environmental noise. The A-weighted decibel constitutes a unit of sound pressure level.

Thus, below a threshold noise "dose", the treatment unit can perform an algorithm for minimizing the noise measured by the local noise sensor.

In contrast, above the threshold noise "dose", the treatment unit may perform an algorithm for minimizing noise as measured by the local noise sensor and as subjected to A-weighting.

In addition to a noise treatment device, the invention provides a vehicle using such a device, e.g. a rotorcraft.

Thus, according to the invention, a vehicle is provided with at least one seat for receiving a passenger, the vehicle having a device for treating noise around the head of a passenger sitting on the seat.

The device may then be of the type described above.

Furthermore, the vehicle may have one or more of the following characteristics.

Optionally, each sound actuator is arranged in said seat.

For example, the support for each sound system may be a headrest.

Optionally, when using a treatment unit that implements a feedforward technique, the treatment device has a reference sensor for sensing primary noise correlated with the source of noise to be treated, said primary noise sensor being connected to the treatment unit of the device in order to deliver a primary noise signal thereto.

The reference primary noise sensor is advantageously arranged outside a zone that is liable to be influenced by the secondary noise generated by the sound actuators.

Advantageously, the vehicle is an aircraft having a main gearbox between an engine and a rotor, the main gearbox being arranged in a given compartment, and the primary noise sensor is placed in that compartment.

Additionally, the vehicle may have a plurality of seats, each associated with a respective noise treatment device having a treatment unit, with at least two treatment units of two distinct devices being incorporated within a single computer.

Thus, by way of example, the vehicle comprises:
  at least one sound system for each treatment device associated with a seat;
  one local noise sound sensor per passenger sitting on a seat;
  one head position for each passenger for each treatment device associated with a seat; and
  a computer controlling all of the sound actuators.

It can be understood that it is also possible to use treatment units that are completely independent, a respective treatment unit being secured to each seat, for example.

Likewise, provision may be made for one reference primary noise sensor per seat, each reference primary noise sensor being secured for example to a seat away from the zone of influence of the sound actuator(s) of the seat.

The invention also provides a method of using the treatment device of the invention.

In the method, noise is attenuated on board a vehicle having a seat suitable for receiving a passenger by using a device having at least one sound system provided with a support and at least one sound actuator carried by the support. During the method the noise is filtered actively by:
  using a local noise sensor to determine continuously the local noise at the passenger's head independently of the position of said head;
  generating a control signal for at least one sound actuator on the basis of the measured local noise in order to create anti-noise for generating a movable bubble of silence associated with the passenger's head, and on the basis of at least one transfer function relating to a natural sound filter associated with the environment of the seat; and
  determining the position of said head in order to keep each transfer function used in preparing said control signal representative of the path to be traveled by said anti-noise.

For example, each transfer function used in preparing said control signal is kept representative of the path to be traveled by said anti-noise:
  either by acting on each sound system so as to keep each transfer function used by the treatment unit constant; and/or
  by selecting from a library each transfer function to be used as a function of the current position of an individual's head.

It is also possible to perform passive filtering of the noise with the help of passive means comprising a soundproof support.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements present in more than one of the figures are given the same references in each of them. Furthermore, it should be observed that the accompanying figures are labeled "FIG." for convenience in the drawings.

DETAILED DESCRIPTION OF THE INVENTION

Figure 1:
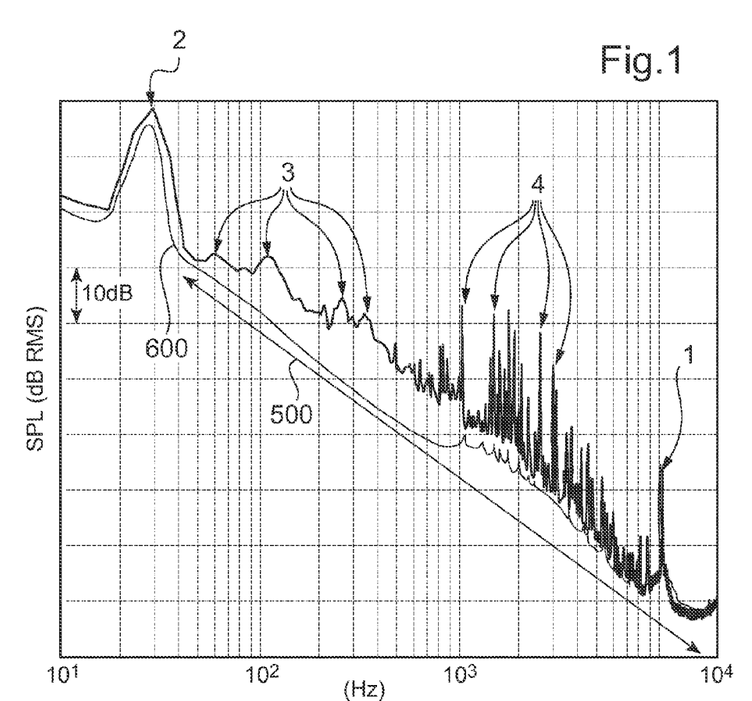
FIG. 1 is a graph showing a spectrum of helicopter noise.

As can be seen in the graph of FIG. 1, the spectrum 1 of the noise that exists in the cabin of a helicopter presents a level that increases up to a maximum 2 exceeding 100 dB for sound frequencies close to 20 Hz to 40 Hz.

Thereafter, the noise level presents a so-called "broadband" component 500 covering frequencies from about 50 Hz to 10,000 Hz, of amplitude that presents a decreasing trend with frequency, and including first spectrum lines 3 centered on frequencies of about 50 Hz to 500 Hz, followed by second spectrum lines 4 centered on frequencies of about 500 Hz to 10,000 Hz.

The present invention seeks in particular to reduce the amplitude of or even to eliminate the broadband components and the spectrum lines 3, 4.

More particularly, the invention provides active treatment seeking to treat the spectrum lines present in a medium frequency range, e.g. extending from 50 Hz to 3000 Hz, and to treat the broadband component in a medium frequency range, e.g. extending from 50 Hz to 1000 Hz.

In addition, passive treatment may seek to treat the spectrum lines present outside that frequency range, e.g. in a high frequency range extending from 3000 Hz to 10,000 Hz.

Under such circumstances, the invention makes it possible to obtain the noise spectrum 600 in the cabin.

Figure 2:
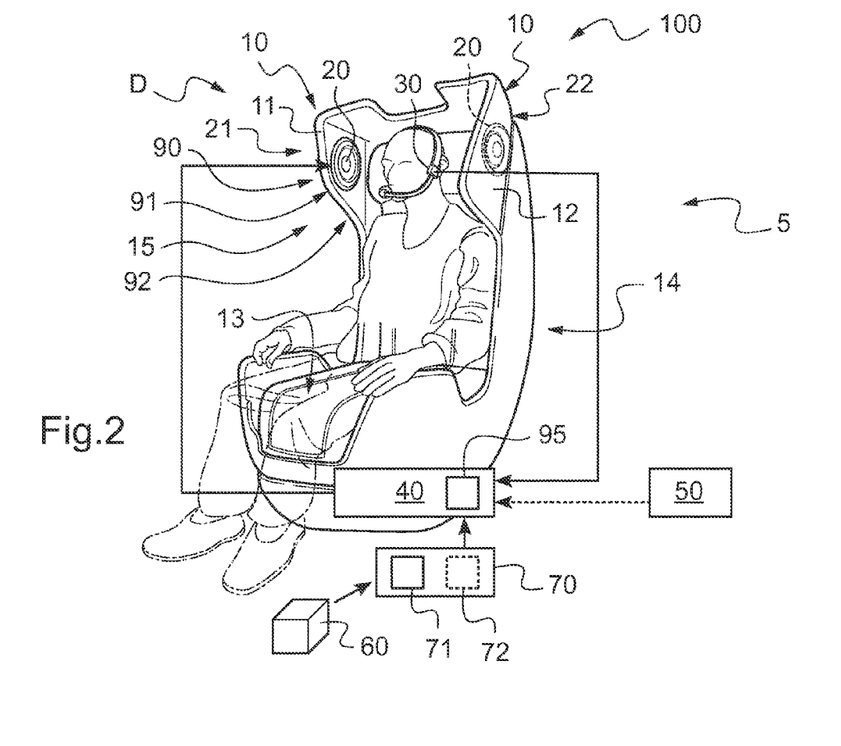
FIG. 2 is a diagram showing a first embodiment.
Figure 3:
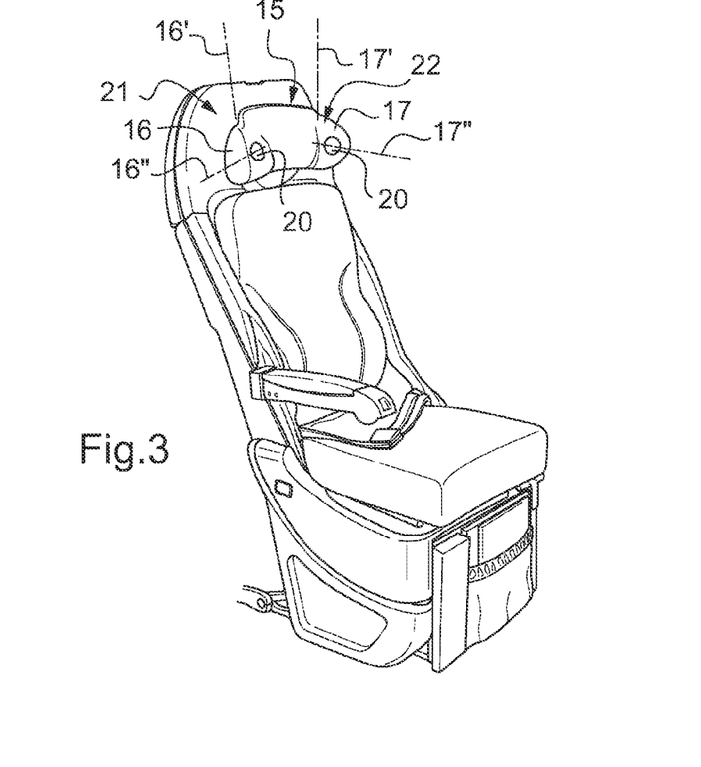
FIG. 3 is a diagram showing a first variant of a second embodiment.
Figure 4:
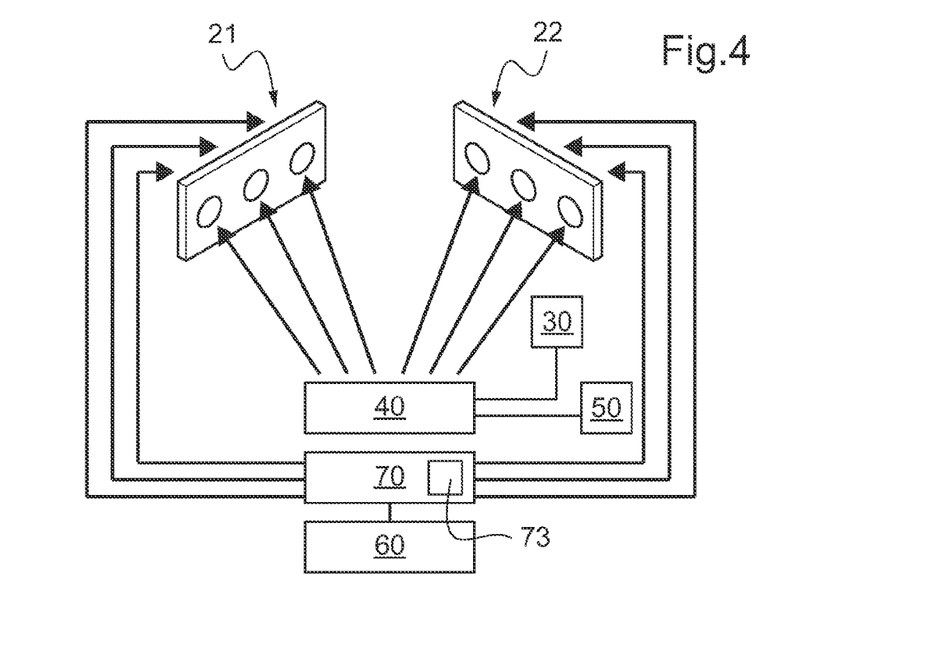
FIG. 4 is a diagram showing a second variant of the second embodiment.

FIGS. 2, 3, and 4 show respectively a first embodiment, a first variant of a second embodiment, and a second variant of the second embodiment of a noise treatment device D around a passenger sitting in a seat 100 of a vehicle 5.

Conventionally, a seat 100 comprises a seat proper 13 and a back 14 having a headpiece 15, such that a passenger sitting on the seat proper 13 presses back against the back 14 and has his or her head against the headpiece 15.

Independently of the embodiment and with reference to FIG. 2, the noise treatment device D has at least one sound system 21, 22 with a sound emitter. Each sound emitter includes at least one sound actuator 20 carried by a support 10.

For example, two sound systems 21, 22 are each provided with an integrated sound actuator 20 of the high-efficiency loudspeaker type.

The two sound systems 21, 22 are possibly arranged on either side of the head of the person sitting on the seat.

In addition, each support 10 may comprise a panel 11, 12 of a headrest.

Furthermore, the sound actuators 20 are connected to a treatment unit 40 of the device D, such as a processor or a segment of code executed by a processor, for example. The treatment unit 40 may be associated with each sound actuator 20 via a wired or a wireless link.

Furthermore, the device D has a position sensor 60 delivering a position signal. The position signal then relates to the position of the passenger's head in the vehicle, or more precisely the position of the ears on the passenger's head.

In addition, the device D has a sound sensor for sensing local noise 30 in order to determine the noise in the immediate proximity of an individual's ears.

This local noise sound sensor 30 may be a movable error sensor arranged on the head of the passenger sitting in the seat 10, and thus in the immediate proximity of one of the passenger's ears. Thus, the local noise sound sensor 30 moves within the vehicle cabin together with the passenger's head, and more specifically with the passenger's ears.

Such a local noise sound sensor 30 may be of the hearing-aid mini-microphone type, of the tie-microphone type, or indeed of the earpiece microphone type.

In another variant, the local noise sensor may be a stationary error sensor. By combining information coming from such a stationary error sensor with the information coming from the position sensor, it is possible to determine the noise that is locally present in the proximity of the head of the individual sitting on the seat.

Independently of the variant, the local noise sound sensor 30 is connected to the treatment unit 40 by a conventional wired or wireless link, with the local noise sound sensor sending a local noise signal to the treatment unit 40.

Furthermore, in an option seeking to implement a feedforward technique, the device D may be provided with a reference primary noise sensor 50. This primary noise sensor 50 sends a primary noise signal to the treatment unit, using a wired or wireless link.

Under such circumstances, the treatment unit sends one control signal per sound actuator as a function of the local noise signal, or as a function of a primary noise signal.

Furthermore, the treatment unit makes use of at least one transfer function per sound system in order to generate the control signal.

However, these transfer functions depend on the path to be traveled by a sound that is emitted via the sound actuators.

Consequently, the device D has active matching means 70 co-operating with the position sensor 60 to keep each of the transfer functions used in preparing each of the control signals representative of the path to be traveled by an anti-noise. Thus an individual who moves does not run the risk of causing the device to malfunction.

The matching means may comprise a processor or a segment of code executed by a processor, for example. The matching means and the treatment unit possibly together form a computer.

Depending on the embodiment, the active matching means comprise:

in the first embodiment, determination means configured to select from a library each transfer function that matches a current position of said head; and in the second embodiment, maintaining means configured to act on each sound system so as to keep each transfer function used by the treatment unit constant.

A third embodiment would be the result of combining those two embodiments.

In the first embodiment shown in FIG. 2, the active matching means 70 has a library of transfer functions, each of which is associated with a respective position of the head of an individual.

The manufacturer thus performs testing to draw up a library having a plurality of sets of transfer functions, each set being associated with a position of the head of an individual. The library is stored in a memory 71 of the active matching means 70.

The active matching means 70 is also provided with determination means 72 configured to determine which transfer function to use as a function of said position. The treatment unit makes use of each transfer function as determined by the determination means 72 for preparing the control signals.

In the first embodiment, the transfer functions for use are thus selected as a function of the position of the head of an individual.

In contrast, in the second embodiment, maintaining means act on the sound systems so as to use only a single set of transfer functions.

In the first variant of the second embodiment, as shown in FIG. 3, the headpiece 15 has two movable side panels 16, 17, with each side panel 16, 17 being suitable for pivoting about at least one pivot axis 16', 16", or 17', 17".

Each side panel thus constitutes movable support means incorporating at least one sound actuator 20, e.g. of the loudspeaker type.

The maintaining means then has a movement system 80 for continuously moving each support means as a function of the position of the head of a passenger.

Figures 5, 6:
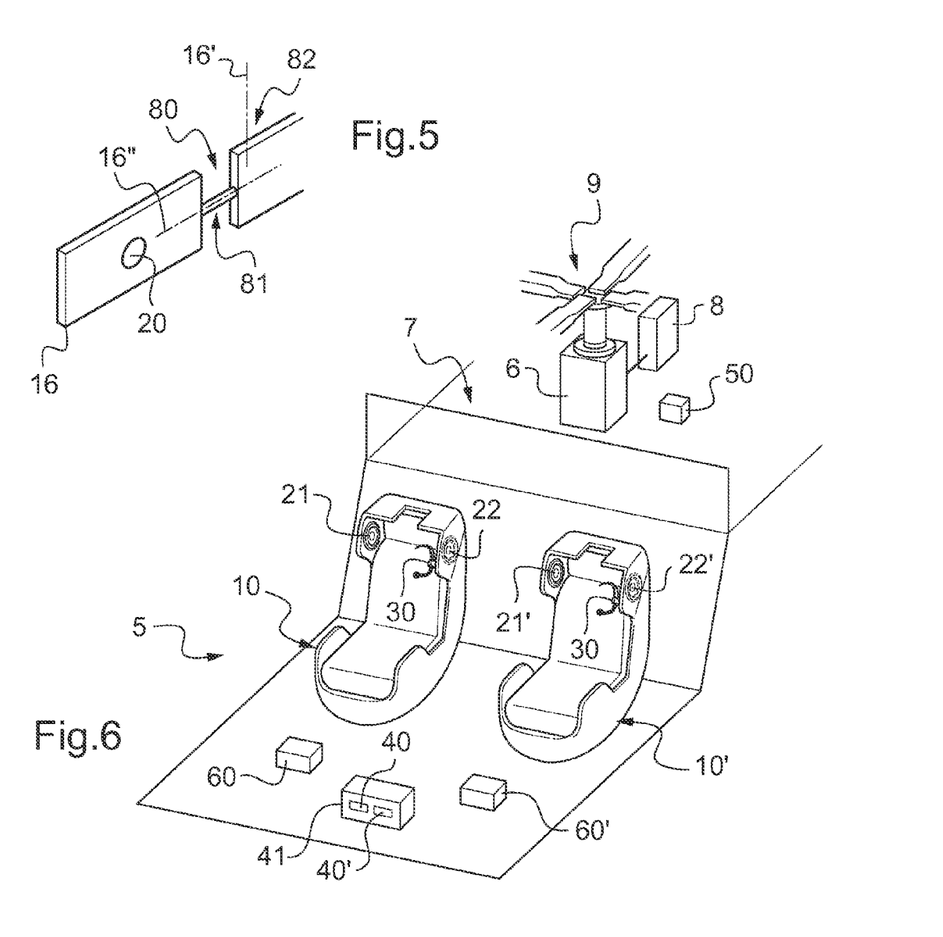
FIG. 5 is a diagram showing movement means of the first variant of the second embodiment.
FIG. 6 is a diagrammatic view of a vehicle of the invention.

With reference to FIG. 5, the movement means may comprise one actuator per pivot axis. Two rotary actuators 81 and 82 are thus shown diagrammatically in FIG. 5.

In the second variant of the second embodiment, as shown in FIG. 4, each sound system 21, 22 has a plurality of sound actuators 20.

The active matching means 70 has control means 73 for continuously controlling each sound actuator as a function of the position of the head of a passenger.

The control means may comprise a processor acting in parallel with the treatment unit to introduce gain for applying to each control signal.

Thus, the control means may increase, reduce, or even eliminate the noise to be emitted by each sound actuator as a function of the position of an individual's head.

The control means may also represent a code segment executed by a processor of the treatment unit, for example.

Furthermore, with reference to FIG. 2, and regardless of the embodiment, each support 11, 12 may include passive soundproofing means 90.

When each support 11, 12 of a sound system has support means carrying each sound actuator of the sound system, each support means comprises a shell 91. Said passive soundproofing means 90 include soundproofing material 92, e.g. constituted in part by foam and arranged inside each shell 91.

The shell of each support may also participate in passive noise treatment by using known techniques. For example, each shell may include microperforations for this purpose.

In addition, the device includes a dose-metering device 95 configured to determine the "dose" of noise received by the passenger from information coming from said local noise sensor, said dose-metering device co-operating with said treatment unit.

The dose-metering device may be a segment of code executed by a processor of the treatment unit.

FIG. 6 shows a vehicle 5 having a plurality of seats, specifically two seats 10, 10', each provided with a respective noise treatment device.

Thus, the first seat 10 has two sound systems 21, 22 associated with a local noise sound sensor 30 and a position sensor 60 for sensing the position of the passenger's head. The device of the first seat then has a first treatment unit 40.

Likewise, the second seat 10' has two sound systems 21', 22' associated with a local noise sound sensor 30' and a position sensor 60' for sensing the position of the passenger's head. The device of the second seat also has a second treatment unit 40'.

The first and second treatment units 40, 40' are then advantageously portions of a single computer 41, each treatment unit being constituted for example by a segment of code programmed in a processor of the computer 41. Nevertheless, it should be understood that the first and second treatment units 40 and 40' could comprise first and second processors that are independent, i.e. one processor per seat.

Furthermore, the noise processor devices of each of the seats make use of a reference primary noise sensor 50, e.g. one reference primary noise sensor 50 that is common to both devices or else one primary noise seat per device.

The reference primary noise sensor 50 is correlated with the source of the noise that is to be canceled. Since the vehicle 5 is an aircraft having a main gearbox 6 arranged between a motor 8 and a rotor 9, the primary noise sensor 50 may for example be arranged in the compartment 7 that receives the main gearbox 6.

Figure 7:
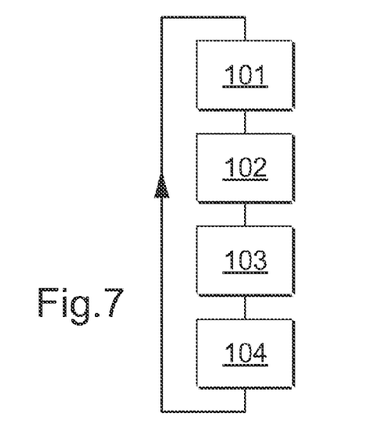
FIG. 7 is a diagram showing the method implemented in the invention.

FIG. 7 explains the process implemented by the noise treatment device D.

During a stage 101, the local noise sound sensor acquires the local noise and transmits a local noise sound signal representative of the measured noise to the treatment unit of the device.

During a stage 102, the treatment unit determines the primary noise that is to be controlled by creating a secondary noise.

If the treatment unit uses a feedforward technique, the treatment unit makes use of a reference primary noise sensor that sends it a primary noise signal relating to said primary noise.

In contrast, if the treatment unit uses a feedback technique, the treatment unit uses its own algorithm for reconstituting said reference primary noise.

During a stage 103, the treatment unit prepares a control signal by filtering said reference primary noise with an adaptive filter making use of a plurality of coefficients.

The coefficients of the filter are recalculated on each sampling step so as to inject a control signal into the sound actuators that is suitable for minimizing the signal received by the local noise sensor. Calculating these coefficients also requires prior knowledge of at least one transfer function between the individual sitting on a seat and the sound actuators.

Under such circumstances, the position of the individual's head is determined in order to keep each transfer function used during the preparation of the control signal representative of the path to be traveled by said anti-noise:

either by acting on each sound system so as to keep the transfer system used by the treatment unit constant; and/or     by selecting from a library which transfer function is to be used as a function of the current position of said head.

Thus, as a function of the primary noise and of the local noise as determined beforehand, the algorithm implemented by the treatment unit adapts said coefficients and the transfer functions and/or said coefficients and the sound systems in order to minimize the local noise at the passenger's head.

During a stage 104, the treatment unit sends control signals to the sound actuators so that they emit a secondary noise having the purpose of being in phase opposition with the primary noise that is to be controlled.

Optionally, prior to sending the control signal, the treatment unit verifies that the passenger's head is in a predetermined action zone of the sound actuators. If not, the treatment unit does not send any instruction to emit the secondary noise to the sound actuators.

Furthermore, it should be observed that the treatment unit may include a weighting module, this module weighting signals entering the treatment unit and/or weighting control signals for the sound actuators. The weighting then serves to optimize one or more sound comfort parameters, in particular loudness or level in dBA, dBG, or dBSIL4, or some comfort indicator that is specific to the vehicle.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A device for treating noise in the proximity of the head of a passenger of a vehicle, the device having at least one local noise sound sensor, the device also having at least one sound system for generating an anti-noise, each sound system being provided with a support and at least one sound actuator carried by the support, wherein the device comprises:
- a position sensor for determining the position of the head of a passenger;
- at least one treatment unit connected to the local noise sound sensor to receive a local noise signal, the treatment unit being configured to deliver a control signal to each sound actuator, which control signal is a function at least of the local noise signal and of at least one transfer function per ear and relating to transferring soundwaves between a sound actuator and a passenger; and
- active matching means co-operating with the position sensor to keep each transfer function that is used in preparing each control signal representative of a path to be traveled by the anti-noise, wherein the support includes respective support means for each sound system, with each support means carrying at least one sound actuator, and the active matching means including a movement system for continuously moving each support means as a function of the position of the head of a passenger so as to keep each transfer function used in preparing each control signal representative of the path to be traveled by the anti-noise.

2. The device according to claim 1, wherein the active matching means comprise maintaining means configured to act on each sound system so as to keep each transfer function used by the treatment unit constant.

3. The device according to claim 1, wherein the active matching means comprise determination means configured to select, from in a library each transfer function that matches a current position of the head.

4. The device according to claim 1, wherein each sound system has a plurality of actuators, and the active matching means comprise control means for continuously controlling each sound actuator as a function of the position of a passenger's head.

5. The device according to claim 1, wherein the active matching means have a library of transfer functions, each associated with one position of the head, and determination means configured to determine which transfer function to use as a function of the position, the treatment unit then using the transfer function as determined by the determination means.

6. The device according to claim 1, wherein each support includes passive soundproofing means.

7. The device according to claim 1, wherein each support of a sound system includes support means carrying a respective sound actuator of the sound system, with each support means including a shell, and the passive soundproofing means include foam soundproofing material arranged in each shell.

8. The device according to claim 1, wherein the device includes a dose-metering device configured to determine the "dose" of noise received by a passenger on the basis of information coming from the local noise sensor, the dose-metering device co-operating with the treatment unit.

9. The device according to claim 1, wherein the local noise sound sensor is arranged on the head of a passenger when a passenger is present.

10. The device according to claim 1, wherein the device has two sound systems arranged on either side of the head of a passenger when a passenger is present.

11. The device according to claim 1, wherein the device includes a primary noise sensor for sensing noise correlated with a source of noise to be treated, the primary noise sensor being connected to the treatment unit in order to provide it with a primary noise signal.

12. A vehicle having at least one seat for receiving a passenger, the vehicle having a noise treatment device around the head of a passenger when sitting in the seat and wherein the noise treatment device is a device according to claim 1.

13. The vehicle according to claim 12, wherein the support is a headrest.

14. The vehicle according to claim 12, wherein the device includes a primary noise sensor connected to the treatment unit of the device to provide it with a primary noise signal, the vehicle being an aircraft having a main gearbox between an engine and a rotor, the main gearbox being arranged in a given compartment, and the primary noise sensor being placed in the compartment.

15. A device for treating noise in the proximity of the head of a passenger of a vehicle, the device having at least one local noise sound sensor, the device also having at least one sound system for generating an anti-noise, each sound system being provided with a support and at least one sound actuator carried by the support, wherein the device comprises:
- a position sensor for determining the position of the head of a passenger;
- at least one treatment unit connected to the local noise sound sensor to receive a local noise signal, the treatment unit being configured to deliver a control signal to each sound actuator, which control signal is a function at least of the local noise signal and of at least one transfer function per ear and relating to transferring soundwaves between a sound actuator and a passenger; and
- active matching means co-operating with the position sensor to keep each transfer function that is used in preparing each control signal representative of a path to be traveled by the anti-noise, wherein each sound system has a plurality of actuators, and the active matching means comprise control means for continuously controlling each sound actuator as a function of the position of a passenger's head.

16. The device according to claim 15, wherein the active matching means comprise maintaining means configured to act on each sound system so as to keep each transfer function used by the treatment unit constant.

17. The device according to claim 15, wherein the active matching means comprise determination means configured to select, from in a library each transfer function that matches a current position of the head.

18. A vehicle having at least one seat for receiving a passenger, the vehicle having a noise treatment device around the head of a passenger when sitting in the seat and wherein the noise treatment device is a device according to claim 15.

19. The vehicle according to claim 18, wherein the device includes a primary noise sensor connected to the treatment unit of the device to provide it with a primary noise signal, the vehicle being an aircraft having a main gearbox between an engine and a rotor, the main gearbox being arranged in a given compartment, and the primary noise sensor being placed in the compartment.

20. A device for treating noise in the proximity of the head of a passenger when seated in a seat of a vehicle, the device having at least one local noise sound sensor, the device also having at least one sound system for generating an anti-noise, each sound system being provided with a support and at least one sound actuator carried by the support, wherein the device comprises:
- a position sensor for determining the position of the head of a passenger when seated in a seat of a vehicle;
- at least one treatment unit connected to the local noise sound sensor to receive a local noise signal, the treatment unit being configured to deliver a control signal to each sound actuator, the control signal being a function at least of the local noise signal and of at least one transfer function per ear and relating to transferring soundwaves between a sound actuator and a passenger when seated in a seat of a vehicle; and active matching means co-operating with the position sensor to keep each transfer function that is used in preparing each control signal representative of a path to be traveled by the anti-noise, wherein the support includes respective support means for each sound system, with each support means carrying at least one sound actuator, and the active matching means including a movement system for continuously moving each support means as a function of the position of the head of a passenger when seated in a seat of a vehicle so as to keep each transfer function used in preparing each control signal representative of the path to be traveled by the anti-noise.

* * * * *